United States Patent [19]

Lech

[11] Patent Number: 4,622,803
[45] Date of Patent: Nov. 18, 1986

[54] HEADER FLOTATION
[75] Inventor: Richard J. Lech, Naperville, Ill.
[73] Assignee: J. I. Case Company, Racine, Wis.
[21] Appl. No.: 625,399
[22] Filed: Jun. 28, 1984
[51] Int. Cl.⁴ .............................................. A01F 12/00
[52] U.S. Cl. ................... 56/10.2; 56/DIG. 15; 56/11.2; 130/27 R; 91/290; 91/433; 172/9
[58] Field of Search ............ 130/27 R; 56/14.6, 10.2, 56/10.4, DIG. 15, 208; 37/DIG. 1; 172/7, 9, 2; 91/390, 433

[56] References Cited

U.S. PATENT DOCUMENTS

| 3,509,701 | 5/1970 | Clarke | 56/208 |
| 3,597,907 | 8/1971 | Neal | 56/208 |
| 3,605,391 | 9/1971 | Schott et al. | 56/208 |
| 3,623,301 | 11/1971 | Hofer | 56/10.4 |
| 3,623,304 | 11/1971 | Molzahn | 56/208 |
| 3,698,164 | 10/1972 | Boone et al. | 56/10.4 |
| 3,878,765 | 4/1975 | Walters et al. | 91/433 |
| 3,924,689 | 12/1975 | Manor | 91/390 |
| 4,020,867 | 5/1977 | Sumiyoshi | 91/433 |
| 4,329,911 | 5/1982 | Schwerin | 172/7 |
| 4,332,126 | 6/1982 | Auwelaer et al. | 56/10.2 |
| 4,362,084 | 12/1982 | Walters | 91/433 |
| 4,372,193 | 2/1983 | Hall | 91/433 |
| 4,463,658 | 8/1984 | Heiser et al. | 91/390 |

FOREIGN PATENT DOCUMENTS 2097642 11/1982 United Kingdom ................... 56/208

OTHER PUBLICATIONS

Bosch Patent—Advertising Literature 1984.

Primary Examiner—Gene Mancene
Assistant Examiner—John G. Weiss
Attorney, Agent, or Firm—Dressler, Goldsmith, Shore, Sutker & Milnamow, Ltd.

[57] ABSTRACT

The hydraulic circuit of the present invention allows flotation of the header without extensive use of accumulators and is readily adaptable to present open center hydraulic systems. The present invention is also adaptable to closed center hydraulic systems with or without flow compensation. The hydraulic system has a pump selectively connected with the header cylinder. Pressure within the header cylinders is automatically maintained at a constant level by fluid addition to the cylinder or by extracting fluid from the cylinders.

25 Claims, 3 Drawing Figures

HEADER FLOTATION

FIELD OF THE INVENTION

The field of the present invention is that of hydraulic systems for floating an implement from a vehicle. More particularly the present invention concerns hydraulic systems for combines and windrowers with a floating header. The present invention is highly useful in "European" type combines wherein the header rides on the ground to harvest grain crops which have been flattened by the high moisture environment. The present invention is also useful in the harvesting of low lying crops such as soybeans. The present invention may be utilized with open center hydraulic systems, or with closed center hydraulic systems with or without flow compensation.

DISCLOSURE STATEMENT

Combines typically have a frame with a pivotally mounted header attached at their front end. The header is raised and lowered by hydraulic cylinders connected between the header and frame. Combines manufactured for grain harvesting in North America are usually designed to operate with the header being spaced a desired distance above the ground. In Europe and other high moisture areas, crops are often leveled by the elements. To harvest leveled or low lying crops the header is lowered to glide along on the ground. Pushing the header forward at ground level causes frictional drag and wear on the header. When pushing the header along at ground level, often a change in terrain will cause the header to plow into the ground.

To lower frictional drag and plowing of the header when operating the header at ground level, it is desirable to support the majority of the weight of the header by the vehicle frame, often referred to as floating the header.

If 90 percent of the header weight is supported by the hydraulic cylinders, only 10 percent of the weight will be supported by the ground. Therefore the frictional drag associated with gliding the header at ground level will be reduced by 90 percent.

Ideally, a flotation system must also allow for changes in the ground support force exerted on the header caused by changes in ground elevation. If ground support forces are allowed to rise, friction drag increases and the header will exhibit a tendency to plow. If ground support forces are too low, the header will tend to bounce or glide over the crops. If the combine approaches an elevating ground level, the ground support force will tend to rise, therefore the cylinder holding the header upward must be extended to maintain a constant level of ground support for the header. If the combine approaches a declining elevation, the cylinder retaining the header in an upward direction must be retracted, to maintain a constant level of ground support force. In an attempt to solve the above problem several approaches have been utilized.

One method to provide flotation for headers is to partially support the header by the use of springs. Supporting the header by springs provides unsatisfactory results due to the vibrational characteristics of springs. Engine vibration may excite the spring elements, and there is a tendency for springs to oscillate beyond acceptable limits when the combine is passing over various field obstructions.

A method of providing a constant float for the header, is to maintain a constant level of fluid pressure within the hydraulic cylinders which support the header.

Molzahn U.S. Pat. No. 3,623,304 provides hydraulic cylinders for supporting a harvester platform eliminating conventional coil springs. Moreover, Molzahn provides for automatic pressurization for the cylinders to their proper preset fluid pressure level for supporting the platform in its working position. However, Molzahn utilizes accumulators in its preferred embodiment. The use of accumulators to provide pressure maintenance within the hydraulic cylinders is undesirable due to their size, especially when dealing with heavier combine headers which also support the feeder mechanism, versus the light headers of the Molzahn windrower. If the header is very large, accumulators will not be able to provide pressure equalization within the cylinders over the full range of angular movement of the header with respect with the combine frame.

Clarke U.S. Pat. No. 3,509,701 describes a header flotation system substantially similar to that of Molzahn. However, Clarke possess the same inherent disadvantage of reliance upon accumulators.

Neither the use of springs or accumulators provide flotation wherein the support force on the header by the frame can be maintained constant over the full range of angular movement of the header in respect with the frame.

Neal U.S. Pat. No. 3,597,907 describes a floating header combine wherein a pressure-responsive switch in the hydraulic system controls the supply of fluid to the cylinder so that a change in the system pressure caused by the header riding higher or lower, results in a vertical force adjustment of the header cylinders as to restore the predetermined load distribution between the hydraulic cylinders and the ground.

The approach taken by Neal requires pressure responsive electrical switching mechanisms. It is desirable wherever possible in hydraulic systems, to keep the system simple by relying on mechanisms which utilize a hydraulic signal rather than an electrical signal. Where electrical controls are utilized, it is preferable to use the more simple on and off type electrical switches, rather than those which provide a proportional response. The Neal approach is also disadvantageous in that it does not provide a floatation system adaptable to combines with closed center hydraulic systems.

SUMMARY OF THE INVENTION

To overcome the disadvantages of prior header flotation systems, the present invention is brought forth. the open center system embodiment of the present invention includes a continuous operating pump for feeding the hydraulic cylinders which support the header. A pressure regulating valve is provided for regulating the desired pressure within the cylinders when the cylinders are in the flotation mode. There is also provided pilot valve operated, raising and lowering valves. By activation of the pilot valves, which control the raise and lowering valves, the header may be raised, lowered, or placed in a flotation mode. Once placed in the flotation mode hydraulic fluid is automatically added or evacuated from the cylinder to maintain a constant fluid pressure within the cylinder, thereby providing a constant ground force on the header.

The closed center embodiment includes a hydraulic cylinder supplied by a variable displacement pump. The closed center system also is provided with a regulating or signaling valve which pilots a pressurizing or depressurizing valve. The pressurizing valve connects the pump with the cylinder. The depressurizing valve relieves fluid from the cylinder. A compensator line may be added to the closed center embodiment to provide a pressure flow compensated closed center hydraulic system.

It is a desire to provide a combine with an improved header flotation system. It is a desire of the present invention to provide a flotation system for floating an implement from an agricultural vehicle wherein the flotation system does not primarily rely on accumulators to maintain pressure within the hydraulic cylinder. It is also a desire of the present invention to provide a flotation system which does not rely on extensive use of electrical sensing devices. It is another desire of an embodiment of the present system to provide a flotation system for combine headers for combines having a standard closed center hydraulic system or a pressure flow compensated closed center hydraulic system. It is yet still another desire of the present invention to provide an open center flotation system which is readily adaptable to the present design of control systems for combine headers.

Other desires and advantages of the present invention will become apparent to those skilled in the art as the nature of the invention is better understood from the accompanying drawings and detailed description.

DETAIL DESCRIPTION OF THE DRAWINGS

Figure 1:
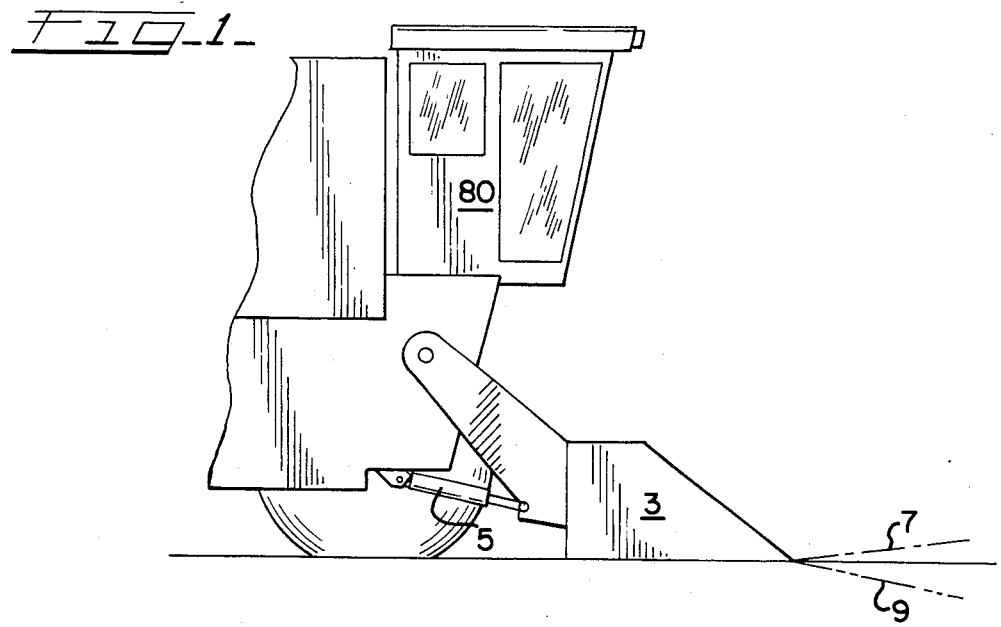
FIG. 1 is a side elevational view of a combine with an attached header illustrating the location of the supporting hydraulic cylinder.

Referring to FIG. 1, extending forwardly from a combine 80 and being pivotally mounted thereto is a partly ground supported header 3. To allow the header to float at ground level, the majority of the weight of the header is supported from the combine frame by cylinders 5. If the combine approaches an elevating stretch of ground as illustrated by phantom line 7, hydraulic fluid must be added to the cylinders to provide a constant level of support of the header from the combine frame. If the combine approaches a trough as represented by a phantom line 9 hydraulic fluid must be removed from the cylinders to keep the ground force exerted on the header constant. The desired effect of maintaining the floating force constant will be realized by keeping the pressure within the cylinders 5 at a constant level regardless of the degree of extension or retraction degree of the cylinders.

Figure 2:
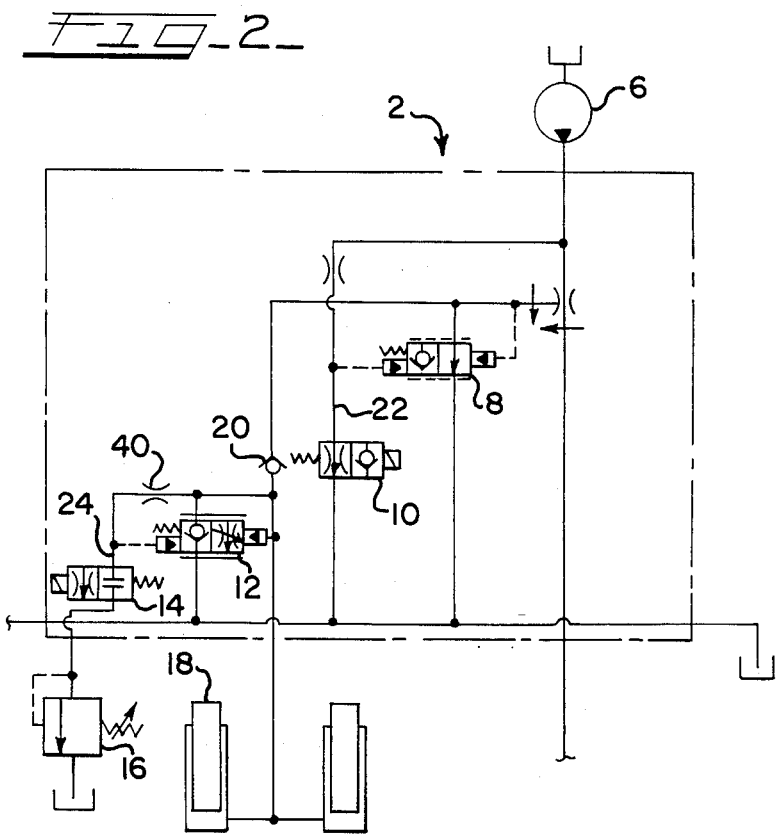
FIG. 2 is a hydraulic schematic diagram of the open center embodiment of the present invention.

Referring to FIG. 2 the open center hydraulic system 2 provides a hydraulic pump 6 to provide a source of pressurized fluid. Raise valve 8, illustrated in the neutral second position, is provided for selectively connecting the pump 6 with the cylinders 18. Lowering valve 12, shown in the neutral position, is provided for evacuating the fluid from the cylinders 18. Check valve 20 is provided to prevent back flow from the cylinders towards the pump 6.

A solenoid actuated pilot raise valve 10 is provided to activate the raise valve 8 from the second to the first position. Pilot raise valve 10 is connected with the raise valve by a raise pilot line 22. When activated by the solenoid, pilot raise valve 10 moves to a position further restricting or (as shown in FIG. 2) preventing flow through pilot line 22. Preventing flow through raise pilot line 22 causes raise valve 8 to shift to its first position, connecting pump 6 with cylinders 18. In a similar manner, a solenoid actuated pilot lowering valve 14 is provided to activate lowering valve 12. Moving pilot lowering valve 14 to a position allowing flow through connective lowering pilot line 24, causes the lowering valve 12 to move to its first position, evacuating the fluid from the cylinders 18.

To raise the header, pilot raise valve 10 is activated, shifting raise valve 8 to its first position, thereby connecting the pump 6 with cylinders 18. When it is desired to lower the header, pilot lowering valve 14 is activated, thereby shifting lowering valve 12 to a position evacuating the fluid from the cylinders 18.

To place the header in a flotation mode both pilot valves 10 and 14 are activated. The activation of pilot lowering valve 14 also connects pressure regulating valve 16 with the system. In the preferred embodiment pressure regulating valve 16 is mounted in the cab and is adjustable by the operator. By adjustment of pressure regulating valve 16 the desired ground pressure of a header is set.

Should the header be elevated by the terrain, fluid from pump 6 will automatically flow into the cylinders until the pressure set by the pressure regulating valve 16 is met. In the preferred embodiment, lowering valve 12 is a metering type valve. At a steady state float condition, excess flow from pump 6 will be released from the hydraulic system by metering valve 12. If the combine header should reach a depression, lowering valve 12 will relieve out an increased amount of fluid to maintain a constant cylinder pressure, and thereby maintain a constant ground support force on the header.

Flow orifice 40 creates a flow resistance in lowering pilot line 24, keeping the flow through regulating valve 16 at a relatively low volume. The low flow through regulating valve 16 reduces heat buildup and makes regulating valve 16 easier to manipulate.

Figure 3:
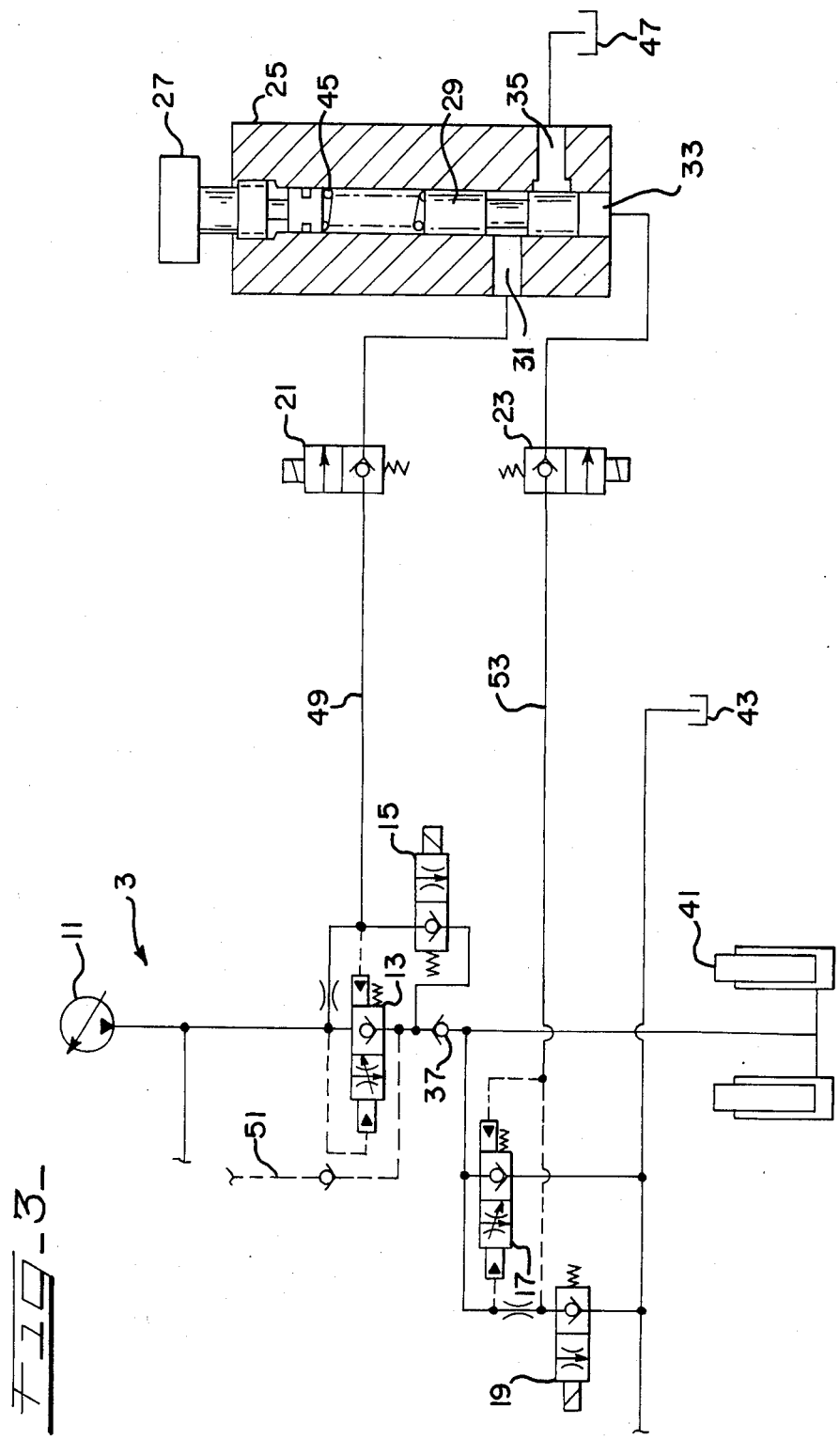
FIG. 3 is a hydraulic schematic diagram of the closed center embodiment of the present invention.

Referring to FIG. 3, the closed center embodiment of the present invention has a pump 11 selectively connected with header supporting cylinders 41. A check valve 37 is placed in the system to prevent back flow from the cylinders to the pump. Pressure signal valve 25 provides a pressure signal to pressurizing valve 13 and depressurizing valve 17. (Raise valve 15 and lowering valve 19 are shown for reason of illustration, however, they do not function in the flotation system.)

To allow the signaling valve 25 to provide a hydraulic signal to the pressurizing and depressurizing valves, there is provided first connecting valve 21 and second connecting valve 23. Connecting valves 21 and 23 are preferably solenoid actuated and are activated to a position allowing flow through lines 49 and 53 when the flotation mode is desired.

Pressurizing valve 13 is illustrated in its neutral position. Upon receipt of a hydraulic signal from signaling valve 25 that the pressure in cylinders 41 is lower than desired, pressurizing valve 13 will shift to the right to selectively connect pump 11 with cylinders 41. Depressurizing valve 17 in a similar manner upon receipt of a hydraulic signal from signaling means 25 that the pressure within cylinder 41 is excessive, will move to the right to evacuate fluid from cylinder 41 to the sump 43.

Pressure signaling valve 25 is preferably mounted within the cab and in the embodiment illustrated is an adjustable spring biased spool valve. To set the desired pressure within the cylinders 41 (thereby setting the ground force in the flotation mode) the operator turns handle 27 compressing spring 45 to bias spool 29.

In operation connecting valves 21 and 23 are activated to place the system in a floating mode. The pressure at port 33 set by signaling valve 25, will be the desired pressure in cylinder 41. If the combine header should reach a declining elevation, the weight supported by the hydraulic cylinders will increase due to the lack of ground support. The increased cylinder pressure will cause spool 29 to move upward, causing a flow condition in line 53. The flow in line 53 causes depressurizing valve 17 to become unbalanced and to shift to the right to evacuate the cylinders 41. If the combine header approaches a rising elevation the valve spool 29 will be shifted downward by the lower pressure experienced at port 33. The pressurizing and depressurizing hydraulic signals in signaling valve 25 are opposing to one another and therefore movement of valve spool 29 in a downward direction connects port 31 with drain 47 via port 35. The flow of oil through line 49 causes pressurizing valve 13 to move to the right thereby connecting pump 11 with cylinders 41.

If it is desired that the closed center hydraulic system 3 be of a load sensing type line 51 is added to the circuit.

While a few embodiments of the present invention have been explained, it will be readily apparent to those skilled in the art of the various modifications which can be made to the present invention without departing from the spirit and scope of this application as encompassed by the following claims.

What is claimed is:

1. A hydraulic system for raising, lowering and floating an implement from an agricultural vehicle in engagement with the ground comprising:
    a pump providing pressurized fluid;
    at least one single-acting cylinder supporting said implement and being selectively connected with said pump;
    a raise valve having a first position connecting said cylinder with said pump;
    a pilot raise valve for activating said raise valve;
    a lowering valve having a first position for evacuating the fluid within said cylinder;
    a pilot lowering valve for activating said lowering valve; and
    hydraulic pressure regulating means connected with said cylinder when the implement is floating and adjustable to transfer a predetermined portion of the weight of the implement to the ground.

2. An apparatus as described in claim 1, wherein the agricultural vehicle is a combine and the implement is a header.

3. An apparatus as described in claim 1, wherein the pilot raise valve is a solenoid operated valve.

4. An apparatus as described in claim 1, wherein the pilot lowering valve is a solenoid operated valve.

5. An apparatus as described in claim 1, wherein there is inserted a check valve between said pump and said cylinder preventing flow from said cylinder toward said pump.

6. An apparatus as described in claim 1, wherein said pressure regulating means is connected with said cylinder when said pilot lowering valve is moved to activate said lowering valve to said lowering valve's first position.

7. An apparatus as described in claim 1, wherein said lowering valve is a metering type valve.

8. A hydraulic system for raising, lowering, and floating a header from a combine in engagement with the ground comprising:
    a pump providing pressurized fluid;
    at least one single-acting cylinder supporting said header from said combine and being selectively connected with said pump;
    a raise valve having a first position connecting said pump with said cylinder and a second position diverting fluid from said pump away from said cylinder;
    a pilot raise valve for activating said raise valve;
    a metering type lowering valve having a first position for evacuating the fluid from said cylinder and having a second position preventing the evacuation of fluid from said cylinder;
    a pilot lowering valve activating said lowering valve;
    a pressure regulating valve connected with said cylinder when said header is floating and adjustable to transfer a predetermined portion of the weight of the header to the ground.

9. An apparatus as described in claim 8, wherein said pilot raise valve and said pilot lowering valve are solenoid operated.

10. An apparatus as described in claim 8, wherein said pilot raise valve is connected with said raise valve by a raise pilot line and wherein movement of said pilot raise valve to a position restraining flow through said raise pilot line activates said raise valve from said second position to said first position.

11. An apparatus as described in claim 8, wherein said pilot lowering valve is connected by a lowering pilot line with said lowering valve and wherein movement of said pilot lowering valve to a position allowing flow through said lowering pilot line activates said lowering valve from said second to said first position.

12. An apparatus as described in claim 11, wherein movement of said pilot lowering valve to activate said lowering valve from said second to said first position, also connects said pressure regulating valve with said cylinders.

13. A hydraulic system for raising, lowering and floating a header from a combine in engagement with the ground comprising:
    a pump providing pressurized fluid;
    a plurality of single-acting cylinders for supporting the header from the combine, said cylinders being selectively connected with said pump;
    a check valve preventing flow from said cylinders toward said pump;
    a raise valve having a first position connecting said pump with said cylinders and having a second position diverting flow from said pump away from said cylinders;
    a solenoid operated pilot raise valve connected with said raise valve by a raise pilot line, said pilot raise valve being moveable to a position blocking flow in said raise pilot line to activate said raise valve to said first position;
    a lowering valve having a first position for evacuating the fluid within said cylinders and a second position to prevent evacuating the fluid from said cylinders;

a solenoid operated pilot lowering valve connected with said lowering valve by a lowering pilot line, said pilot lowering valve being moveable to a position allowing flow through said lowering pilot line to activate said lowering valve to said first position; and a pressure regulating valve connected with said cylinder when said pilot lowering valve is in a position allowing flow through said lowering pilot line, said pressure regulating valve being adjustable to transfer a predetermined portion of the weight of said header to the ground when the header is floating.

14. A closed center hydraulic system for floating an implement from an agricultural vehicle in engagement with the ground comprising:

at least one single-acting cylinder supporting said implement;

pressure signal means providing a hydraulic signal related to the desired pressure setting within said cylinder for transferring a desired portion of the weight of the implement to the ground;

a pump for supplying pressurized fluid to said cylinder;

a pressurizing valve for selectively connecting said pump with said cylinder in response to the hydraulic signal of said pressure signal means; and a depressurizing valve selectively evacuating the fluid from said cylinder in response to the signal of said pressure signal means.

15. An apparatus as described in claim 14, wherein the agricultural vehicle is a combine and the implement is a header.

16. An apparatus as described in claim 14, wherein said hydraulic system is pressure flow compensated having a sense line connecting with an outlet of said pressurizing valve.

17. An apparatus as described in claim 14, further comprising a first connecting valve between said pressure signal means and said pressurizing valve.

18. An apparatus as described in claim 14, further comprising a second connecting valve between said pressure signal means and said depressurizing valve.

19. An apparatus as described in claim 17, wherein said first connecting valve is solenoid operated.

20. An apparatus as described in claim 18, wherein said second connecting valve is solenoid operated.

21. An apparatus as described in claim 14, wherein said pressure signal means is a biased spool valve.

22. A closed center hydraulic system for floating an implement from an agricultural vehicle in engagement with the ground comprising:

at least one single-acting cylinder supporting the implement;

an adjustable pressure signal valve providing a hydraulic signal related to the desired pressure setting within said cylinder for transferring a desired portion of the weight of the implement to the ground;

a pump for supplying pressurized fluid to said cylinder;

a pressurizing valve for selectively connecting said pump with said cylinder in response to the hydraulic signal of said pressure signal valve;

a first connecting valve between said pressure signal valve and said pressurizing valve allowing passage of the hydraulic signal from said pressure signal valve to said pressurizing valve;

a depressurizing valve selectively evacuating fluid from said cylinder in response to a signal of said pressure signal valve; and a second connecting valve allowing passage of the hydraulic signal from said pressure signal valve to said depressurizing valve.

23. An agricultural combine with a closed center pressure flow compensated hydraulic system for floating the header in engagement with the ground comprising:

at least one single-acting cylinder supporting the header;

an adjustable pressure signal valve providing a hydraulic signal related to the desired pressure setting within said cylinder for transferring a desired portion of the weight of the header to the ground;

a pump for supplying pressurized fluid to said cylinder;

a pressurizing valve for selectively connecting said pump with said cylinder in response to the hydraulic signal of said pressure signal valve;

a first connecting valve between said pressure signal valve and said pressurizing valve allowing passage of the hydraulic signal from said pressure signal valve to said pressurizing valve;

a depressurizing valve selectively evacuating fluid from said cylinder in response to a signal of said pressure signal valve; and a second connecting valve allowing passage of the hydraulic signal from said pressure signal valve to said depressurizing valve.

24. An agricultural combine as described in claim 23, wherein said first and second connector valves are solenoid operated.

25. An apparatus as recited in claim 22, wherein said pressure signal valve is spring loaded and wherein the pressure signal connecting with said pressurizing valve and the pressure signal connecting with said depressurizing valve are opposing with one another.

* * * * *